United States Patent
Svilan et al.

(10) Patent No.: US 10,108,454 B2
(45) Date of Patent: Oct. 23, 2018

(54) MANAGING DYNAMIC CAPACITANCE USING CODE SCHEDULING

(71) Applicant: Intel Corporation, Santa Clara, CA (US)

(72) Inventors: Vjekoslav Svilan, Sunnyvale, CA (US); David N. Mackintosh, Mountain View, CA (US)

(73) Assignee: Intel Corporation, Santa Clara, CA (US)

( * ) Notice: Subject to any disclaimer, the term of this patent is extended or adjusted under 35 U.S.C. 154(b) by 6 days.

(21) Appl. No.: 14/221,750

(22) Filed: Mar. 21, 2014

(65) Prior Publication Data

US 2015/0268997 A1  Sep. 24, 2015

(51) Int. Cl.
G06F 9/48 (2006.01)
G06F 1/32 (2006.01)
G06F 8/41 (2018.01)

(52) U.S. Cl.
CPC ............ *G06F 9/4893* (2013.01); *G06F 1/329* (2013.01); *G06F 1/3243* (2013.01); *G06F 8/4432* (2013.01); *Y02D 10/152* (2018.01); *Y02D 10/24* (2018.01)

(58) Field of Classification Search
CPC ....... G06F 1/329; G06F 8/4432; G06F 9/4893
See application file for complete search history.

(56) References Cited

U.S. PATENT DOCUMENTS

| 5,163,153 | A | 11/1992 | Cole et al. |
| 5,522,087 | A | 5/1996 | Hsiang |
| 5,590,341 | A | 12/1996 | Matter |
| 5,621,250 | A | 4/1997 | Kim |
| 5,931,950 | A | 8/1999 | Hsu |
| 6,564,328 | B1 * | 5/2003 | Grochowski ......... G06F 1/3203 712/E9.049 |
| 6,748,546 | B1 | 6/2004 | Mirov et al. |

(Continued)

FOREIGN PATENT DOCUMENTS

| CN | 101542442 | 9/2009 |
| EP | 1 282 030 A1 | 5/2003 |
| IN | 773/DEL/2011 | 3/2011 |

OTHER PUBLICATIONS

Chen et al., "Post-Silicon Design Methodology on Chip Power Characterization, Validation, and Debug Applied on High Performance Per Watt Microprocessor." 2007 International Symposium on VLSI Design, Automation and Test (VLSI-DAT). IEEE, 2007.*

(Continued)

*Primary Examiner* — Chameli Das
*Assistant Examiner* — Joanne Macasiano
(74) *Attorney, Agent, or Firm* — Trop, Pruner & Hu, P.C.

(57) ABSTRACT

In an embodiment, a processor includes a schedule logic to schedule a set of instructions for execution in an execution logic of the processor and a power analysis logic having a first calculation logic to calculate a maximum dynamic capacitance for at least a portion of the processor and a second calculation logic to calculate a dynamic capacitance estimate for execution of the set of instructions. A rescheduling of the set of instructions may occur based on a comparison of the dynamic capacitance estimate and the maximum dynamic capacitance. Other embodiments are described and claimed.

19 Claims, 10 Drawing Sheets

(56) References Cited

U.S. PATENT DOCUMENTS

| | | |
|---|---|---|
| 6,792,392 B1 | 9/2004 | Knight |
| 6,823,516 B1 | 11/2004 | Cooper |
| 6,829,713 B2 | 12/2004 | Cooper et al. |
| 6,996,728 B2 | 2/2006 | Singh |
| 7,010,708 B2 | 3/2006 | Ma |
| 7,043,649 B2 | 5/2006 | Terrell |
| 7,093,147 B2 | 8/2006 | Farkas et al. |
| 7,111,179 B1 | 9/2006 | Girson et al. |
| 7,194,643 B2 | 3/2007 | Gonzalez et al. |
| 7,272,730 B1 | 9/2007 | Acquaviva et al. |
| 7,412,615 B2 | 8/2008 | Yokota et al. |
| 7,434,073 B2 | 10/2008 | Magklis |
| 7,437,270 B2 | 10/2008 | Song et al. |
| 7,454,632 B2 | 11/2008 | Kardach et al. |
| 7,529,956 B2 | 5/2009 | Stufflebeam |
| 7,539,885 B2 | 5/2009 | Ma |
| 7,730,340 B2 | 6/2010 | Hu et al. |
| 7,737,770 B2 | 6/2010 | Kuhn |
| 7,992,017 B2 | 8/2011 | Safford |
| 2001/0044909 A1 | 11/2001 | Oh et al. |
| 2002/0010847 A1* | 1/2002 | Abdallah et al. ............... 712/22 |
| 2002/0194509 A1 | 12/2002 | Plante et al. |
| 2003/0061383 A1 | 3/2003 | Zilka |
| 2003/0126476 A1* | 7/2003 | Greene ................ G06F 1/3203 713/300 |
| 2004/0064752 A1 | 4/2004 | Kazachinsky et al. |
| 2004/0098560 A1 | 5/2004 | Storvik et al. |
| 2004/0139356 A1 | 7/2004 | Ma |
| 2004/0268166 A1 | 12/2004 | Farkas et al. |
| 2005/0015631 A1 | 1/2005 | McDonald et al. |
| 2005/0022038 A1 | 1/2005 | Kaushik et al. |
| 2005/0033881 A1 | 2/2005 | Yao |
| 2005/0132238 A1 | 6/2005 | Nanja |
| 2006/0050670 A1 | 3/2006 | Hillyard et al. |
| 2006/0052970 A1* | 3/2006 | Arabi et al. ................ 702/132 |
| 2006/0053326 A1 | 3/2006 | Naveh |
| 2006/0059286 A1 | 3/2006 | Bertone et al. |
| 2006/0069936 A1 | 3/2006 | Lint et al. |
| 2006/0117202 A1 | 6/2006 | Magklis et al. |
| 2006/0184287 A1 | 8/2006 | Belady et al. |
| 2007/0005995 A1 | 1/2007 | Kardach et al. |
| 2007/0016817 A1 | 1/2007 | Albonesi et al. |
| 2007/0079294 A1 | 4/2007 | Knight |
| 2007/0106827 A1 | 5/2007 | Boatright et al. |
| 2007/0156992 A1 | 7/2007 | Jahagirdar |
| 2007/0214342 A1 | 9/2007 | Newburn |
| 2007/0239398 A1 | 10/2007 | Song et al. |
| 2007/0245163 A1 | 10/2007 | Lu et al. |
| 2008/0028183 A1* | 1/2008 | Hwu et al. ................ 712/20 |
| 2008/0028240 A1 | 1/2008 | Arai et al. |
| 2008/0250260 A1 | 10/2008 | Tomita |
| 2009/0006871 A1 | 1/2009 | Liu et al. |
| 2009/0150695 A1 | 6/2009 | Song et al. |
| 2009/0150696 A1 | 6/2009 | Song et al. |
| 2009/0158061 A1 | 6/2009 | Schmitz et al. |
| 2009/0158067 A1 | 6/2009 | Bodas et al. |
| 2009/0172375 A1 | 7/2009 | Rotem et al. |
| 2009/0172428 A1 | 7/2009 | Lee |
| 2009/0235105 A1 | 9/2009 | Branover et al. |
| 2009/0300329 A1 | 12/2009 | Naffziger et al. |
| 2010/0077243 A1 | 3/2010 | Wang et al. |
| 2010/0115309 A1 | 5/2010 | Carvalho et al. |
| 2010/0146513 A1 | 6/2010 | Song |
| 2010/0153761 A1 | 6/2010 | Nishioka |
| 2010/0191997 A1 | 7/2010 | Dodeja et al. |
| 2011/0018523 A1 | 1/2011 | Priel et al. |
| 2011/0040995 A1 | 2/2011 | Basak |
| 2011/0154090 A1 | 6/2011 | Dixon et al. |
| 2011/0185203 A1 | 7/2011 | Carlson et al. |
| 2012/0079290 A1 | 3/2012 | Kumar |
| 2012/0098553 A1 | 4/2012 | Karlsson et al. |
| 2012/0246506 A1 | 9/2012 | Knight |
| 2012/0254643 A1* | 10/2012 | Fetzer et al. ................ 713/320 |
| 2013/0061064 A1 | 3/2013 | Ananthakrishnan et al. |
| 2013/0080803 A1 | 3/2013 | Ananthakrishnan et al. |
| 2013/0080804 A1 | 3/2013 | Ananthakrishnan et al. |
| 2013/0111120 A1 | 5/2013 | Ananthakrishnan et al. |
| 2013/0111121 A1 | 5/2013 | Ananthakrishnan et al. |
| 2013/0111226 A1 | 5/2013 | Ananthakrishnan et al. |
| 2013/0111236 A1 | 5/2013 | Ananthakrishnan et al. |
| 2013/0275782 A1* | 10/2013 | Svilan et al. ................ 713/300 |
| 2014/0006817 A1 | 1/2014 | Bonen et al. |
| 2014/0359328 A1* | 12/2014 | Burns .................... G06F 1/324 713/322 |

OTHER PUBLICATIONS

Diken et al., "Construction and exploitation of VLIW ASIPs with heterogeneous vector-widths", Published Jan. 1, 2014 in Microprocessors and Microsystems, https://pure.tue.nl/ws/files/3859556/388486373136275.pdf, pp. 947-951.*

Gepner, Pawel, and Michal Filip Kowalik. "Multi-core processors: New way to achieve high system performance." Parallel Computing in Electrical Engineering, 2006. PAR ELEC 2006. International Symposium on. IEEE, 2006.*

Gupta, Vishal, et al. "HeteroMates: Providing high dynamic power range on client devices using heterogeneous core groups." Green Computing Conference (IGCC), 2012 International. IEEE, 2012.*

Intel Developer Forum, IDF2010, Opher Kahn, et al., "Intel Next Generation Microarchitecture Codename Sandy Bridge: New Processor Innovations," Sep. 13, 2010, 58 pages.

SPEC—Power and Performance, Design Overview V1.10, Standard Performance Information Corp., Oct. 21, 2008, 6 pages.

Intel Technology Journal, "Power and Thermal Management in the Intel Core Duo Processor," May 15, 2006, pp. 109-122.

Anoop Iyer, et al., "Power and Performance Evaluation of Globally Asynchronous Locally Synchronous Processors," 2002, pp. 1-11.

Greg Semeraro, et al., "Hiding Synchronization Delays in A GALS Processor Microarchitecture," 2004, pp. 1-13.

Joan-Manuel Parcerisa, et al., "Efficient Interconnects for Clustered Microarchitectures," 2002, pp. 1-10.

Grigorios Magklis, et al., "Profile-Based Dynamic Voltage and Frequency Scalling for a Multiple Clock Domain Microprocessor," 2003, pp. 1-12.

Greg Semeraro, et al., "Dynamic Frequency and Voltage Control for a Multiple Clock Domain Architecture," 2002, pp. 1-12.

Greg Semeraro, "Energy-Efficient Processor Design Using Multiple Clock Domains with Dynamic Voltage and Frequency Scaling," 2002, pp. 29-40.

Diana Marculescu, "Application Adaptive Energy Efficient Clustered Architectures," 2004, pp. 344-349.

L. Benini, et al., "System-Level Dynamic Power Management," 1999, pp. 23-31.

Ravindra Jejurikar, et al., "Leakage Aware Dynamic Voltage Scaling for Real-Time Embedded Systems," 2004, pp. 275-280.

Ravindra Jejurikar, et al., "Dynamic Slack Reclamation With Procrastination Scheduling in Real-Time Embedded Systems," 2005, pp. 13-17.

R. Todling, et al., "Some Strategies for Kalman Filtering and Smoothing," 1996, pp. 1-21.

R.E. Kalman, "A New Approach to Linear Filtering and Prediction Problems," 1960, pp. 1-12.

International Application No. PCT/US2012/028865, filed Mar. 13, 2012, entitled "Providing Efficient Turbo Operation of a Processor," by Intel Corporation.

International Application No. PCT/US2012/028902, filed Mar. 13, 2012, entitled "Dynamically Controlling Interconnect Frequency in a Processor," by Intel Corporation.

International Application No. PCT/US2012/028876, filed Mar. 13, 2012, entitled "Dynamically Computing an Electrical Design Point (EDP) for a Multicore Processor," by Intel Corporation.

U.S. Appl. No. 13/600,568, filed Aug. 31, 2012, entitled, "Configuring Power Management Functionality in a Processor," by Malini K. Bhandaru, et al.

* cited by examiner

MANAGING DYNAMIC CAPACITANCE USING CODE SCHEDULING

TECHNICAL FIELD

Embodiments relate to power management of a system, and more particularly to power management of a multicore processor.

BACKGROUND

Advances in semiconductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computing devices consume a sizeable percentage of the entire electricity supply for a country, such as the United States of America. As a result, there is a vital need for energy efficiency and conservation associated with integrated circuits. These needs will increase as servers, desktop computers, notebooks, Ultrabooks™, tablets, mobile phones, processors, embedded systems, etc. become even more prevalent (from inclusion in the typical computer, automobiles, and televisions to biotechnology).

In processors, workload changes can occur very quickly. This can cause dynamic switching capacitance (Cdyn) to change very quickly from very low to very high (e.g., due to a power virus condition). Many aspects of the design, such as a thermal design power (TDP) specification is set close to or at the highest end of the power consumption to satisfy rare but possible excursions into the highest extremes of the power range. High TDP specification increases overall system cost and also influences other characteristic such as overall product thickness.

Power delivery network specifications, due to the requirement of even shorter time response as compared to thermal issues, typically have an even higher maximum current requirement scenario, even when that scenario is too short to cause a significant increase in processor temperature. This type of requirement increases overall device size, type of components included in a system and overall cost.

DETAILED DESCRIPTION

In various embodiments, a pre-emptive power management technique may be used to dynamically schedule code execution on a processor. More specifically, a power aware scheduler may determine or receive information regarding an estimated dynamic capacitance (Cdyn) value for code to be executed, ahead of actual execution. Then, based at least in part on this information, the code may be directly executed or re-scheduled one or more times prior to execution such that a power efficient scheduling of execution is realized. In this way, power management may be performed in a pre-emptive manner to avoid undesired power excursions, rather than simply reacting to such power excursions. While the embodiments described herein are applicable to a binary translation (BT) system in which executed instructions are first scheduled by a power-aware translator, understand that the scope of the present invention is not limited in this regard, and other embodiments apply equally to generic compiler-schedulers and just-in-time compilers.

Figure 1:
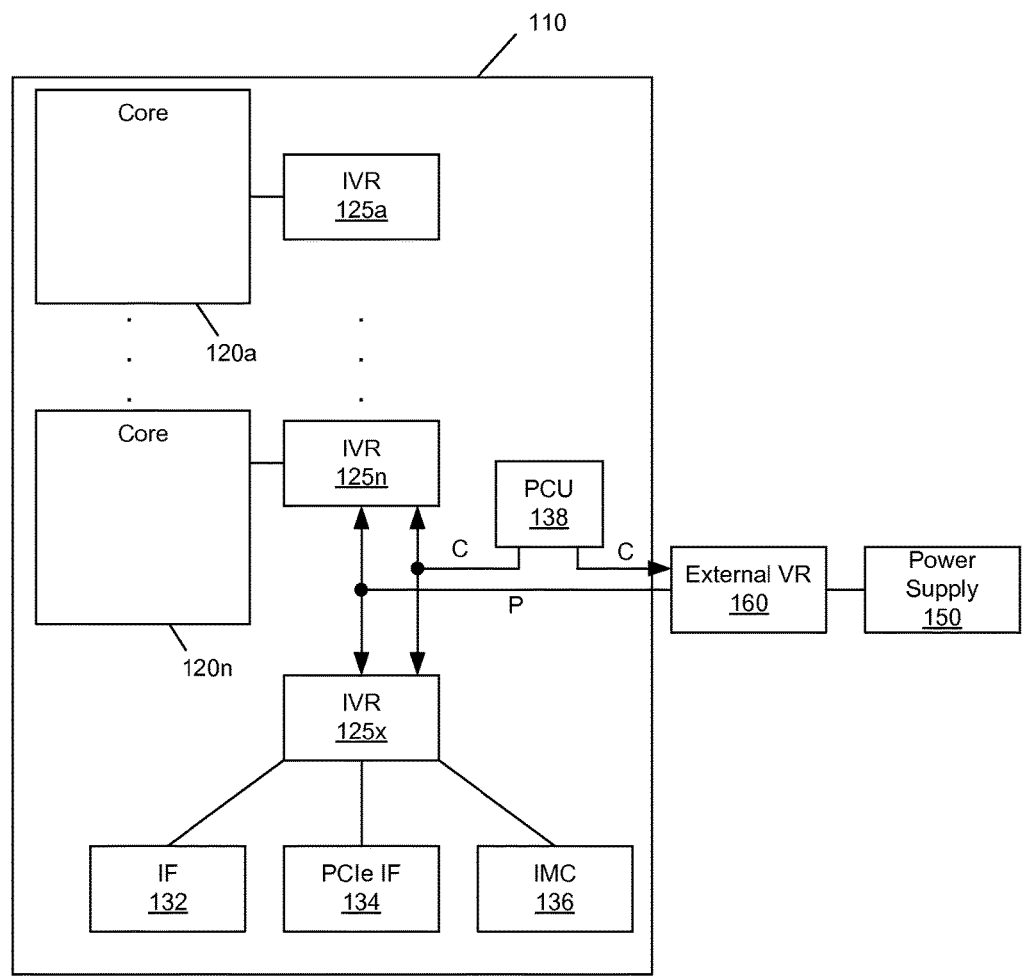
FIG. 1 is a block diagram of a system in accordance with one embodiment of the present invention.

Referring now to FIG. 1, shown is a block diagram of a portion of a system in accordance with an embodiment of the present invention. As shown in FIG. 1, system 100 may include various components, including a processor 110 which as shown is a multicore processor. Processor 110 may be coupled to a power supply 150 via an external voltage regulator 160, which may perform a first voltage conversion to provide a primary regulated voltage to processor 110.

As seen, processor 110 may be a single die processor including multiple cores $120_a$-$120_a$. In addition, each core may be associated with an integrated voltage regulator (IVR) $125_a$-$125_n$ which receives the primary regulated voltage and generates an operating voltage to be provided to one or more agents of the processor associated with the IVR. Accordingly, an IVR implementation may be provided to allow for fine-grained control of voltage and thus power and performance of each individual core. As such, each core can operate at an independent voltage and frequency, enabling great flexibility and affording wide opportunities for balancing power consumption with performance.

Still referring to FIG. 1, additional components may be present within the processor including an input/output interface 132, another interface 134, and an integrated memory controller 136. As seen, each of these components may be powered by another integrated voltage regulator $125_x$. In one embodiment, interface 132 may be in accordance with the Intel® Quick Path Interconnect (QPI) protocol, which provides for point-to-point (PtP) links in a cache coherent protocol that includes multiple layers including a physical layer, a link layer and a protocol layer. In turn, interface 134 may be in accordance with a Peripheral Component Interconnect Express (PCIe™) specification, e.g., the PCI Express™ Specification Base Specification version 2.0 (published Jan. 17, 2007).

Also shown is a power control unit (PCU) 138, which may include hardware, software and/or firmware to perform power management operations with regard to processor 110.

As seen, PCU 138 provides control information to external voltage regulator 160 via a digital interface to cause the voltage regulator to generate the appropriate regulated voltage. PCU 138 also provides control information to IVRs 125 via another digital interface to control the operating voltage generated (or to cause a corresponding IVR to be disabled in a low power mode). In various embodiments, PCU 138 may include logic to determine a maximum dynamic capacitance level allowed in the processor based at least in part on a maximum power limit of the processor While not shown for ease of illustration, understand that additional components may be present within processor 110 such as uncore logic, and other components such as internal memories, e.g., one or more levels of a cache memory hierarchy and so forth. Furthermore, while shown in the implementation of FIG. 1 with an integrated voltage regulator, embodiments are not so limited.

Although the following embodiments are described with reference to energy conservation and energy efficiency in specific integrated circuits, such as in computing platforms or processors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to any particular type of computer systems, and may be also used in other devices, such as handheld devices, systems on chip (SoCs), and embedded applications. Some examples of handheld devices include cellular phones, Internet protocol devices, digital cameras, personal digital assistants (PDAs), and handheld PCs. Embedded applications typically include a microcontroller, a digital signal processor (DSP), network computers (NetPC), set-top boxes, network hubs, wide area network (WAN) switches, or any other system that can perform the functions and operations taught below. Moreover, the apparatus', methods, and systems described herein are not limited to physical computing devices, but may also relate to software optimizations for energy conservation and efficiency. As will become readily apparent in the description below, the embodiments of methods, apparatus', and systems described herein (whether in reference to hardware, firmware, software, or a combination thereof) are vital to a 'green technology' future, such as for power conservation and energy efficiency in products that encompass a large portion of the US economy.

Note that the pre-emptive code rescheduling and dynamic capacitance analysis described herein may be independent of and complementary to an operating system (OS)-based mechanism, such as the Advanced Configuration and Platform Interface (ACPI) standard (e.g., Rev. 3.0b, published Oct. 10, 2006). According to ACPI, a processor can operate at various performance states or levels, so-called P-states, namely from P0 to PN. In general, the P1 performance state may correspond to the highest guaranteed performance state that can be requested by an OS. In addition to this P1 state, the OS can further request a higher performance state, namely a P0 state. This P0 state may thus be an opportunistic or turbo mode state in which, when power and/or thermal budget is available, processor hardware can configure the processor or at least portions thereof to operate at a higher than guaranteed frequency. In many implementations a processor can include multiple so-called bin frequencies above the P1 guaranteed maximum frequency, exceeding to a maximum peak frequency of the particular processor, as fused or otherwise written into the processor during manufacture. In addition, according to ACPI, a processor can operate at various power states or levels. With regard to power states, ACPI specifies different power consumption states, generally referred to as C-states, C0, C1 to Cn states. When a core is active, it runs at a C0 state, and when the core is idle it may be placed in a core low power state, also called a core non-zero C-state (e.g., C1-C6 states), with each C-state being at a lower power consumption level (such that C6 is a deeper low power state than C1, and so forth).

Figure 2:
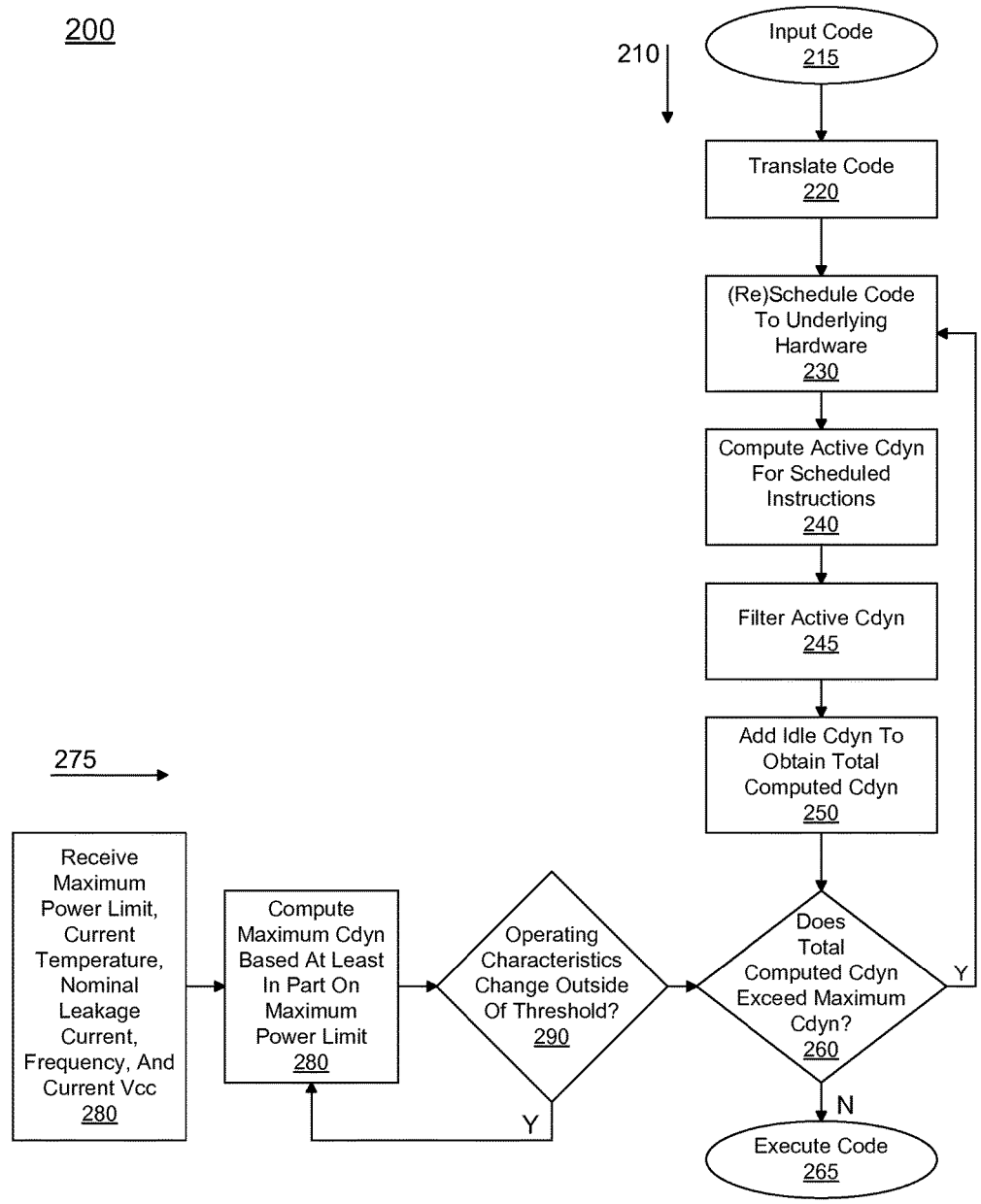
FIG. 2 is a flow diagram of a method in accordance with an embodiment of the present invention.

Referring now to FIG. 2, shown is a flow diagram of a method in accordance with an embodiment of the present invention. Method 200 may be performed using combinations of hardware, firmware, and/or software. For example, combinations of logic of a PCU and a binary translation engine each may execute portions of method 200. As shown in FIG. 2, method 200 may be used for determining a maximum allowable dynamic capacitance and a computed dynamic capacitance value, and for dynamically scheduling and executing code based at least in part on power analysis information performed as described herein.

Referring now to a first branch 210 of FIG. 2, method 200 begins during normal execution of code. In the embodiment shown, understand that the execution of code is on a processor that performs binary translation, e.g., when a given code segment is determined to be of a so-called hot path, such as determined based on profiling.

Thus as seen in first branch 210, a first collection of code is input (block 215). Note that in the embodiment of FIG. 2, this group of code may be a given portion of an application program, e.g., a code segment written with instructions of a first instruction set architecture. Assume for purposes of discussion that this instruction set architecture is different than the instruction set architecture of the underlying processor. Accordingly, more efficient code execution, e.g., by way of faster code execution, reduced power consumption among many other metrics, may be realized by performing translation of the code. Thus as seen at block 220 the code is translated. In an embodiment, a binary translator of the processor may perform such code translation.

Still referring to FIG. 2, next control passes to block 230 where the code may be scheduled to the underlying hardware of the processor. Again this scheduling process may be performed by the binary translator. Or in other embodiments such code scheduling may be performed by a front end of the processor, a compiler or other scheduling engine.

Referring still to FIG. 2, next various steps may be performed to compute an active Cdyn value for the scheduled instructions (block 240). Although various manners of calculating this active Cdyn value may occur, one particular embodiment is described further below. Note that the maximum active Cdyn value for each instruction of an instruction set architecture may be calculated by running specially designed code (for example, running a series of ADD instructions through a machine to determine Cdyn for the ADD instructions). Such calculations may be performed in hardware or through a power simulator, and stored in a configuration storage of the processor. Where multiple instructions are executed together (such as in an in-order very large instruction word (VLIW) processor), the active Cdyn values of instructions within the VLIW bundle are added together.

At block 245 this active Cdyn value may be applied to a filter. In general, this filtering operation may be used to determine an average active Cdyn value, which may be an average maximum active Cdyn value estimated to occur during execution of the scheduled code. Due to pipelining, multiple instructions execute at the same time in the machine, and thus a sliding window of several consecutive instructions contributes to the active Cdyn at any point of the schedule. Note that the result of blocks 240-245 thus determines the maximum active Cdyn used by the scheduled code.

Finally, control passes to block 250 where a total computed Cdyn value may be obtained by adding an idle Cdyn value to this calculated active Cdyn value. In an embodiment, this idle Cdyn value may be a predetermined value that corresponds to an idle value for dynamic capacitance of the processor, e.g., determined during manufacturing testing and stored in a configuration register of the processor. In some embodiments, multiple such values may be stored, each associated with a given voltage, frequency and/or temperature at which the processor may operate.

While the embodiment of FIG. 2 may be with regard to an in-order processor in which scheduling is the dominant determinant of the pipeline contents, embodiments may also be used in connection with out-of-order processors. Also note that the scheduling can be completed within a single pass by calculating the current sliding window Cdyn value incrementally and only selecting for execution instructions that do not exceed the maximum Cdyn value.

Still referring to FIG. 2, next it can be determined whether this total computed Cdyn value exceeds a maximum Cdyn value (diamond 260). If not, the scheduled code is executed in one or more execution logics of the processor (block 265). Otherwise, if the total computed Cdyn value exceeds the maximum Cdyn value, control passes back to block 230 where the code may be rescheduled. That is, given that this scheduled set of code would exceed the maximum allowed dynamic capacitance, instead of executing the code and causing some type of power or other issue, the code may be rescheduled.

Different manners of code rescheduling may occur in different embodiments. For example, different instructions may be used to accomplish one or more operations within the code segment to realize the desired code execution with a lower maximum capacitance value. Or the code may be scheduled with certain idle times such as one or more no operations (NOPs) inserted within the scheduled code to enable a lower maximum dynamic capacitance value. Thus the rescheduled code may include one or more instructions not present in the original scheduling (and note that the instructions may be in the form of micro-operations, in some embodiments). Or certain instructions may be replaced with instructions of a lower power consumption level. For example, vector instructions of a first vector width (e.g., 512 bit wide vector instructions) of an original scheduling may be replaced with vector instructions of a different vector width (e.g., 256 bit wide vector instructions). Similarly, full width cache accesses can be replaced with two half width accesses. Of course many other examples of code rescheduling are possible.

Note that at diamond 260, the total computed dynamic capacitance value is compared to a maximum dynamic capacitance value. In the embodiment of FIG. 2, a second branch 275 may be used to dynamically determine this maximum dynamic capacitance value. Of course in other implementations a predetermined and fixed maximum capacitance value instead may be used. However, greater accuracy of the power analysis determination may occur by using a dynamically determined maximum dynamic capacitance value that takes into account activity of the processor and its current voltage, frequency and temperature.

Thus referring still to FIG. 2, branch 275 begins at block 280 where various values are received. In the embodiment shown these values include a maximum power limit and nominal leakage current for the processor, and a current temperature, frequency and operating voltage. Then at block 290 a maximum dynamic capacitance value may be determined, based at least in part on a maximum power limit. More specifically, this value may be computed to be at a level such that the processor can operate under the maximum power limit of the processor.

In an embodiment, the maximum Cdyn value may be derived from a maximum power limit for the processor (which may be dynamically determined by a PCU or other power management logic, or may be a fixed value).

Following are simple power equations:

$$\text{Power} = P_{Dynamic} + P_{Leakage} \qquad [\text{EQ. 1}];$$

and $$\text{Power} = Cdyn \times Vcc^2 \times f + Ioff \times Vcc \qquad [\text{EQ. 2}]$$

where $P_{Dynamic}$ and $P_{Leakage}$ are respectively, dynamic power and leakage power, $V_{cc}$ is an operating voltage, f is frequency, and Ioff is a leakage current, which is based on $Ioff_{sort}$ which is the leakage current measured during wafer sort. This Ioff value is derived from $Ioff_{sort}$ value based on the temperature and supply voltage difference between sort and operational conditions.

From these Equations, a maximum dynamic capacitance value can be determined as follows:

$$Cdyn_{max} = \frac{Power_{max} - Ioff \times Vcc}{Vcc^2 \times f} \qquad [\text{EQ. 3}]$$

where $Power_{max}$, Vcc and frequency (f) are all values that may be obtained from information sources present in a system.

This maximum dynamic capacitance value thus may be used in the determination at diamond 260. Note that during dynamic operation of the processor this value may be updated, e.g., when any given operating characteristic of the processor (e.g., temperature, frequency, voltage or power allocation) changes outside of some threshold limit (as determined at diamond 290). Understand that while shown with this particular implementation in the embodiment of FIG. 2, the scope of the present invention is not limited in this regard.

Figure 3:
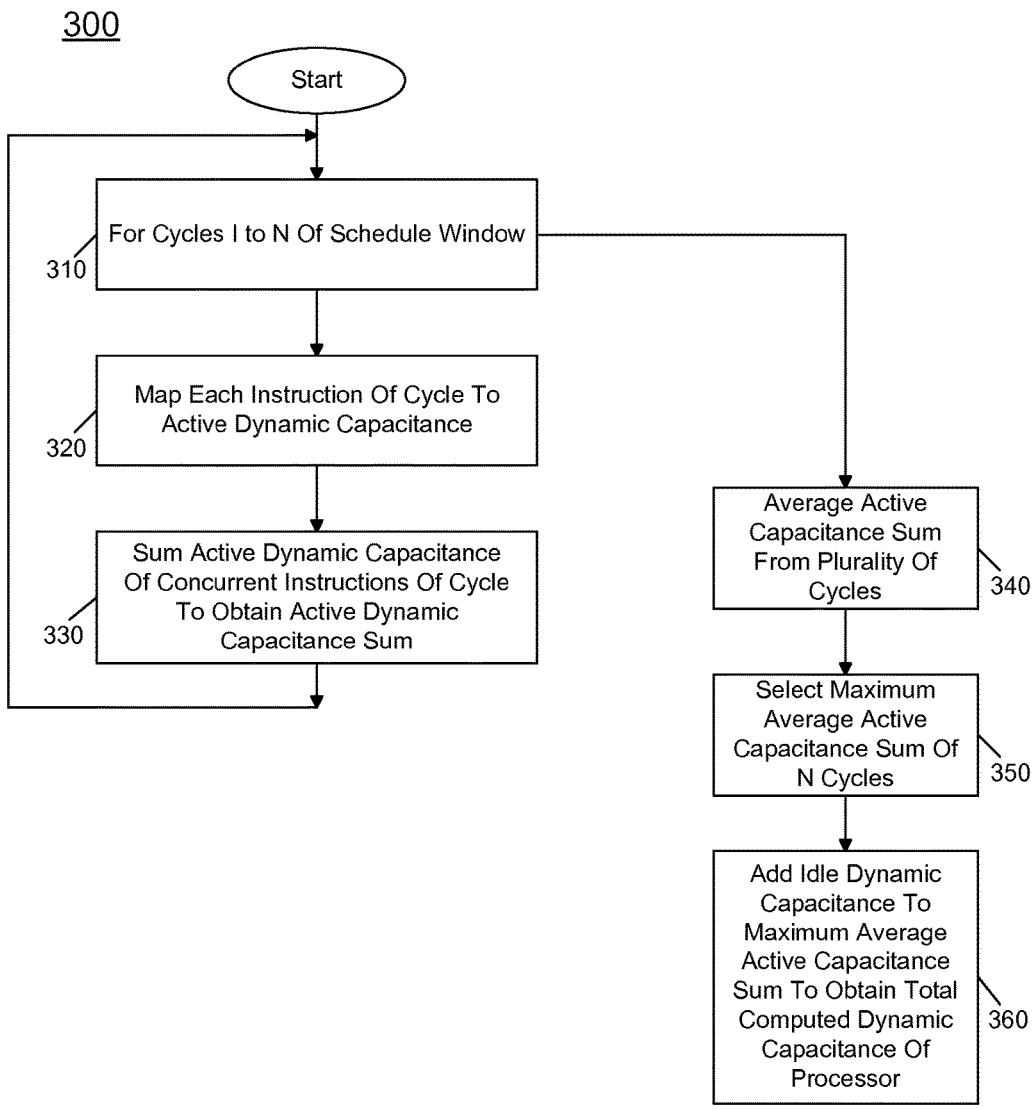
FIG. 3 is a flow diagram of a method for estimating dynamic capacitance in accordance with one embodiment of the present invention.

Referring now to FIG. 3, shown is a flow diagram of a method for estimating dynamic capacitance in accordance with one embodiment of the present invention. Method 300 also can be implemented in the same control logic as the operations of FIG. 2. More specifically, method 300 may correspond to further details regarding the operations performed generally at blocks 240-250 of FIG. 2.

As seen, method 300 provides a loop of operations to be performed for each clock cycle of an instruction grouping window. As discussed above in one embodiment this schedule window (of translated code, in many embodiments) can be between approximately 10-100 cycles in one embodiment. For each such cycle of a window, control begins at block 310 and passes to block 320 where each instruction of the cycle can be mapped to an active dynamic capacitance. In one embodiment, a table-based mapping can be performed such that for each instruction type, a given capacitance value can be determined. In one embodiment this capacitance can be based on the types of circuitry that are enabled for execution of the instruction. In some embodiments this table can be fixed and stored, e.g., in a non-volatile storage. However in other embodiments, this table can be dynamically generated, and may be updated when processor temperature and/or other parameters such as a supply voltage exceeds a certain threshold.

Still referring to FIG. 3, next control passes to block 330 where the active dynamic capacitance of the concurrently executed instructions of the cycle can be summed to obtain an active dynamic capacitance sum. This loop of blocks 310-330 can be performed for every cycle of the instruction window under analysis. Upon conclusion control next passes to block 340.

At block 340, the active capacitance sums can be averaged from multiple cycles of the instruction window to obtain an average active capacitance sum for each cycle. As one example, three cycles within this larger instruction grouping window can be averaged such that each cycle is associated with an average value that is the average of multiple cycles within the window. Still referring to FIG. 3, control next passes to block 350 where the maximum of these active average capacitance sums can be selected. Then at block 360 an idle dynamic capacitance value may be added to this maximum average active capacitance sum to obtain a total computed dynamic capacitance of the processor for the scheduled code block.

Note that the active dynamic capacitance values vary depending on the types of instructions to be executed. Typically, an instruction performs different operations, such as addition (ADD), multiplication (MULT), load (LD), store (ST), branch (BRC) and similar operations. This is illustrated in Table 1, where instructions executed in 7 consecutive cycles are shown.

TABLE 3

| Active Cdyn Sum Per Cycle | Average Across Window (Size = 3) | Maximum Average Active Cdyn Estimate | Total Dynamic Capacitance |
|---|---|---|---|
| 2.4 | 2.4 | | |
| 1 | 1.9 | | |
| 3.7 | 1.9 | | |
| 1 | 2.3 | | |
| 1 | 2.7 | 2.7 | 3.1 |
| 5 | ... | | |
| 2.1 | ... | | |

Different manners of estimating Cdyn for a section of code can occur. In an example embodiment, the following steps may be used: mapping each instruction to a corresponding active Cdyn value, as each such instruction uses different amounts of transistor activity to accomplish different tasks, as illustrated in Table 2; combining active Cdyn values of each concurrently executed instruction (e.g., by adding them together as shown in "Active Cdyn Sum per Cycle" column of Table 3) to calculate active Cdyn for a given cycle. Next, Cdyn values for each cycle can be averaged with values in adjacent cycles over a given averaging window. This windowed average may be used to account for pipeline stages and for existing local charge which is shared from cycle to cycle. This is illustrated in the column titled "Average across Window" of Table 3. In this particular case, a window size of 3 may be used. The maximum average may be selected as the total computed dynamic Cdyn value. Then the total dynamic capacitance can be obtained by adding an idle Cdyn value to the maximum average value. As an example of idle Cdyn, in

TABLE 1

| | Pipe | | | | | | |
|---|---|---|---|---|---|---|---|
| Cycle | PIPE1 | PIPE2 | PIPE3 | PIPE4 | PIPE5 | PIPE ... | PIPEN |
| 1 | | ADD | LD | | | | |
| 2 | ADD | | | | | | |
| 3 | ADD | MUL | LD | | | | |
| 4 | ADD | | | | | | |
| 5 | SUB | | | | | | |
| 6 | ADD | MUL | LD | ST | | | |
| 7 | ADD | | | | | | BRC |

Then as shown in Table 2, each instruction is assigned an appropriate active Cdyn value. Then as shown in Table 3, an active Cdyn sum per cycle may be obtained, along with various calculations based on this sum. Note that numbers used in the Tables are just an example of various Cdyn values that instructions may use.

Table 3, an idle value of 0.4 was added. Of course, understand that various modifications and adjustments may be made in other embodiments.

Figure 4:
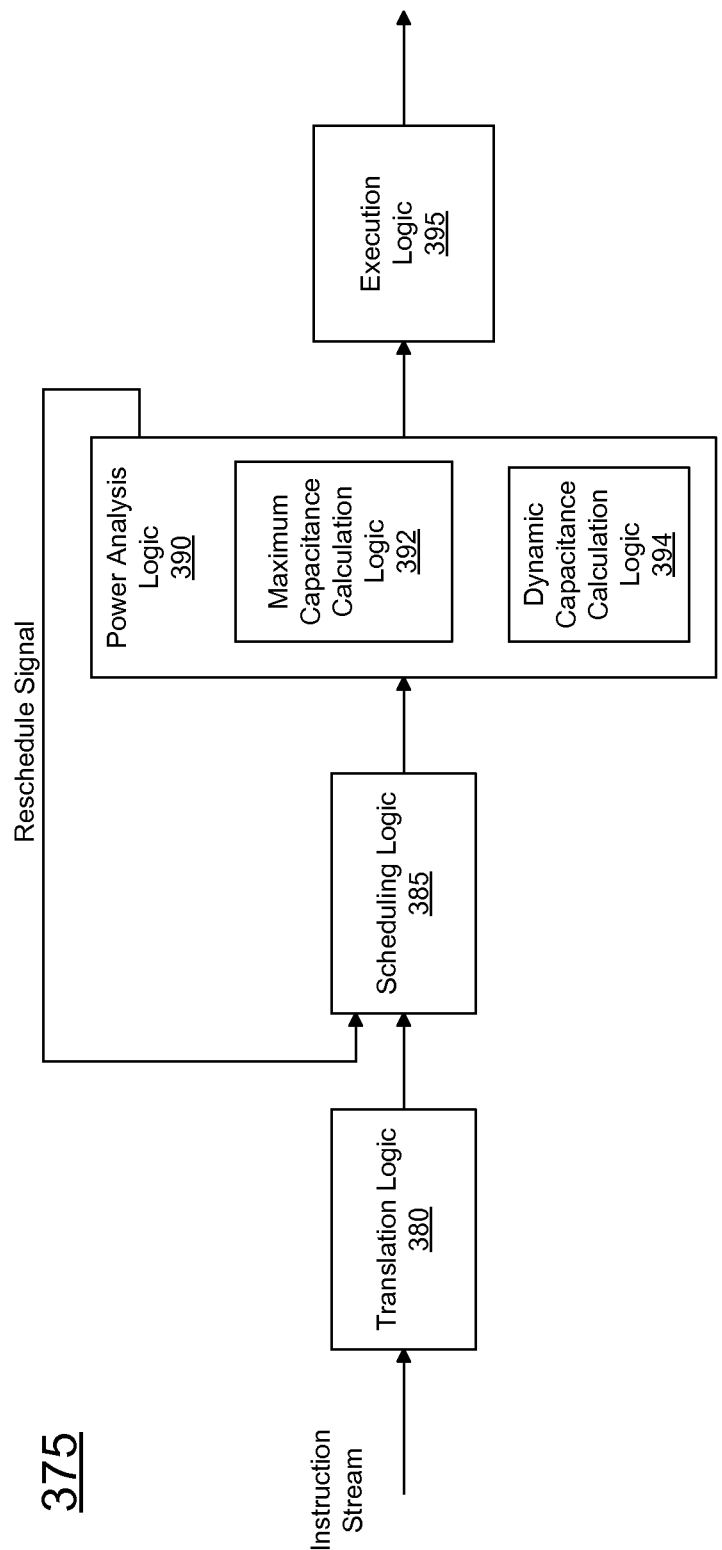
FIG. 4 is a block diagram of a portion of a processor in accordance with an embodiment of the present invention.

Referring now to FIG. 4, shown is a block diagram of a portion of a processor in accordance with an embodiment of the present invention. In FIG. 4, processor portion 375 may

TABLE 2

| | Pipe | | | | | | |
|---|---|---|---|---|---|---|---|
| Cycle | PIPE1 | PIPE2 | PIPE3 | PIPE4 | PIPE5 | PIPE ... | PIPEN |
| 1 | | 1 | 1.4 | | | | |
| 2 | 1 | | | | | | |
| 3 | 1 | 1.3 | 1.4 | | | | |
| 4 | 1 | | | | | | |
| 5 | 1 | | | | | | |
| 6 | 1 | 1.3 | 1.4 | 1.3 | | | |
| 7 | 1 | | | | | | 1.1 | be implemented using various logic and/or other hardware, circuitry, firmware and/or software of a processor.

In the embodiment of FIG. 4, a translation logic 380 receives an instruction stream, which may be a group of instructions such as macro-instructions of a given application executing on the processor. More specifically, these instructions may be part of a hot code path that is frequently executed during the application and such, the expense incurred by translation is deemed to be appropriate to enable improved operation. Translation logic 380 may thus translate the incoming instruction stream into scheduled code including instructions appropriate for the underlying hardware of the processor. For example, micro-operations of a different instruction set architecture may be generated and scheduled into a code block for execution by a scheduling logic 385.

Prior to the actual scheduling of this code block to hardware of the processor (such as an execution logic 395, which may include one or more parallel processing pipelines), the scheduled code is first provided to a power analysis logic 390. In general, power analysis logic 390 may analyze the code to calculate a computed dynamic capacitance value for execution of the code and compare it to a maximum dynamic capacitance value. In the embodiment shown, power analysis logic 390 includes a maximum capacitance calculation logic 392 and a dynamic capacitance calculation logic 394. These logics may operate according to method 200 of FIG. 2 in an embodiment, to determine both the dynamic capacitance value for the code block and the maximum dynamic capacitance value to be allowed for the current operating characteristics of the processor.

If power analysis logic 390 determines that the calculated dynamic capacitance value exceeds the maximum dynamic capacitance value, a reschedule signal may be communicated back to scheduling logic 385 as a feedback signal to thus cause scheduling logic 385 to reschedule the code block. Such rescheduling may take various forms and may include selection of different instructions for execution, insertion of one or more NOPs, among many other rescheduling techniques.

When an appropriate code block of scheduled instructions is thus determined to be present, the code block is provided to execution logic 395 for execution. Understand that while shown with this particular implementation in the FIG. 4 embodiment, many variations and alternatives are possible. For example, understand that in some implementations one or more of the components shown in FIG. 4 may be optional, such as translation logic 380.

Figure 5:
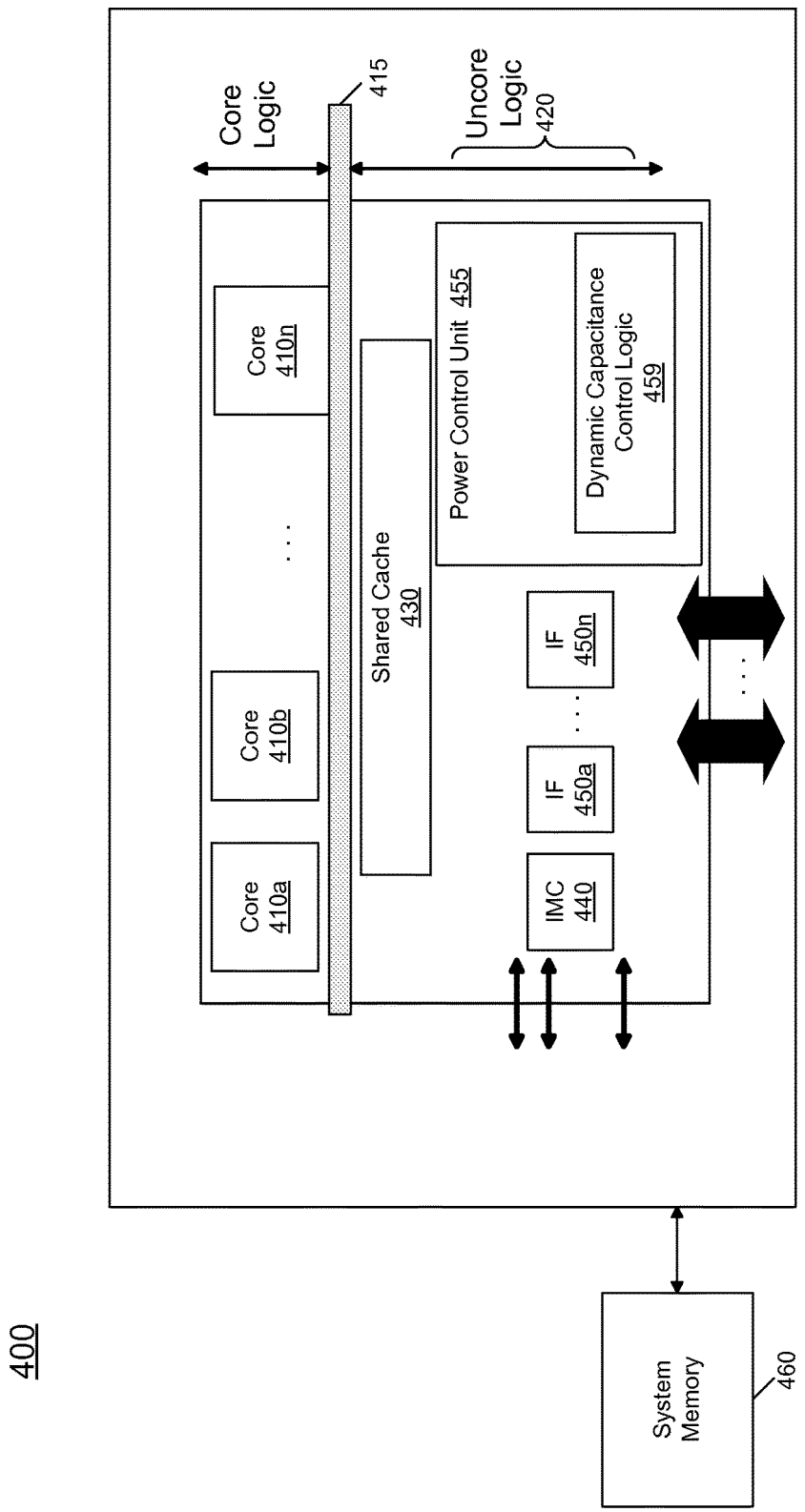
FIG. 5 is a block diagram of a processor in accordance with an embodiment of the present invention.

Embodiments can be implemented in processors for various markets including server processors, desktop processors, mobile processors and so forth. Referring now to FIG. 5, shown is a block diagram of a processor in accordance with an embodiment of the present invention. As shown in FIG. 5, processor 400 may be a multicore processor including a plurality of cores $410_a$-$410_n$. In one embodiment, each such core may be of an independent power domain and can be configured to enter and exit active states and/or maximum performance states based on workload. The various cores may be coupled via an interconnect 415 to a system agent or uncore 420 that includes various components. As seen, the uncore 420 may include a shared cache 430 which may be a last level cache. In addition, the uncore may include an integrated memory controller 440, various interfaces 450 and a power control unit 455. In various embodiments, power control unit 455 may include a dynamic capacitance control logic 459 in accordance with an embodiment of the present invention. In an embodiment, this control logic may generally include the calculation logics of power analysis logic 390 of FIG. 4 (namely calculation logics 392 and 394). Using this logic, a determination of a maximum dynamic capacitance can be made. Still further, this logic may determine the dynamic capacitance value for a code block to be executed on the processor. Still further, understand that the PCU may also implement the scheduling logic and/or power analysis logic to dynamically schedule and reschedule code blocks based on a dynamic capacitance analysis.

With further reference to FIG. 5, processor 400 may communicate with a system memory 460, e.g., via a memory bus. In addition, by interfaces 450, connection can be made to various off-chip components such as peripheral devices, mass storage and so forth. While shown with this particular implementation in the embodiment of FIG. 5, the scope of the present invention is not limited in this regard.

Figure 6:
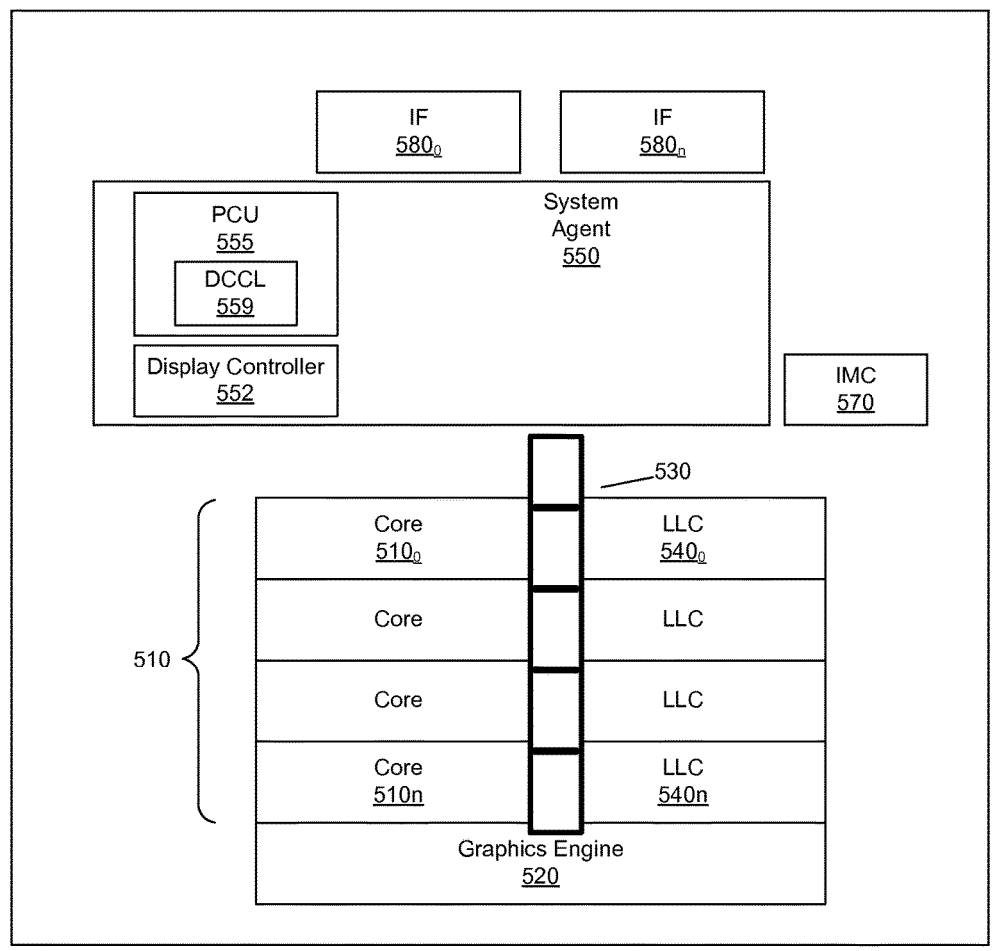
FIG. 6 is a block diagram of a multi-domain processor in accordance with another embodiment of the present invention.

Referring now to FIG. 6, shown is a block diagram of a multi-domain processor in accordance with another embodiment of the present invention. As shown in the embodiment of FIG. 6, processor 500 includes multiple domains. Specifically, a core domain 510 can include a plurality of cores $510_0$-$510_n$, a graphics domain 520 can include one or more graphics engines, and a system agent domain 550 may further be present. In some embodiments, system agent domain 550 may execute at an independent frequency than the core domain and may remain powered on at all times to handle power control events and power management such that domains 510 and 520 can be controlled to dynamically enter into and exit high power and low power states. Each of domains 510 and 520 may operate at different voltage and/or power. Note that while only shown with three domains, understand the scope of the present invention is not limited in this regard and additional domains can be present in other embodiments. For example, multiple core domains may be present each including at least one core.

In general, each core 510 may further include low level caches in addition to various execution units and additional processing elements. In turn, the various cores may be coupled to each other and to a shared cache memory formed of a plurality of units of a last level cache (LLC) $540_0$-$540_n$. In various embodiments, LLC 540 may be shared amongst the cores and the graphics engine, as well as various media processing circuitry. As seen, a ring interconnect 530 thus couples the cores together, and provides interconnection between the cores, graphics domain 520 and system agent circuitry 550. In one embodiment, interconnect 530 can be part of the core domain. However in other embodiments the ring interconnect can be of its own domain.

As further seen, system agent domain 550 may include display controller 552 which may provide control of and an interface to an associated display. As further seen, system agent domain 550 may include a power control unit 555 which can include a dynamic capacitance control logic 559 in accordance with an embodiment of the present invention to dynamically determine a maximum capacitance level, e.g., based at least in part on a maximum power limit of the processor. Again understand that additional portions of processor 500 may perform dynamic scheduling as described herein based on comparison of a computed dynamic capacitance to this maximum dynamic capacitance value. In various embodiments, this logic may execute at least portions of the algorithms described above in FIG. 2.

As further seen in FIG. 6, processor 500 can further include an integrated memory controller (IMC) 570 that can provide for an interface to a system memory, such as a dynamic random access memory (DRAM). Multiple interfaces $580_0$-$580_n$ may be present to enable interconnection between the processor and other circuitry. For example, in one embodiment at least one direct media interface (DMI) interface may be provided as well as one or more Peripheral Component Interconnect Express (PCI Express™ (PCIe™)) interfaces. Still further, to provide for communications between other agents such as additional processors or other circuitry, one or more interfaces in accordance with an Intel® Quick Path Interconnect (QPI) protocol may also be provided. Although shown at this high level in the embodiment of FIG. 6, understand the scope of the present invention is not limited in this regard.

Figure 7:
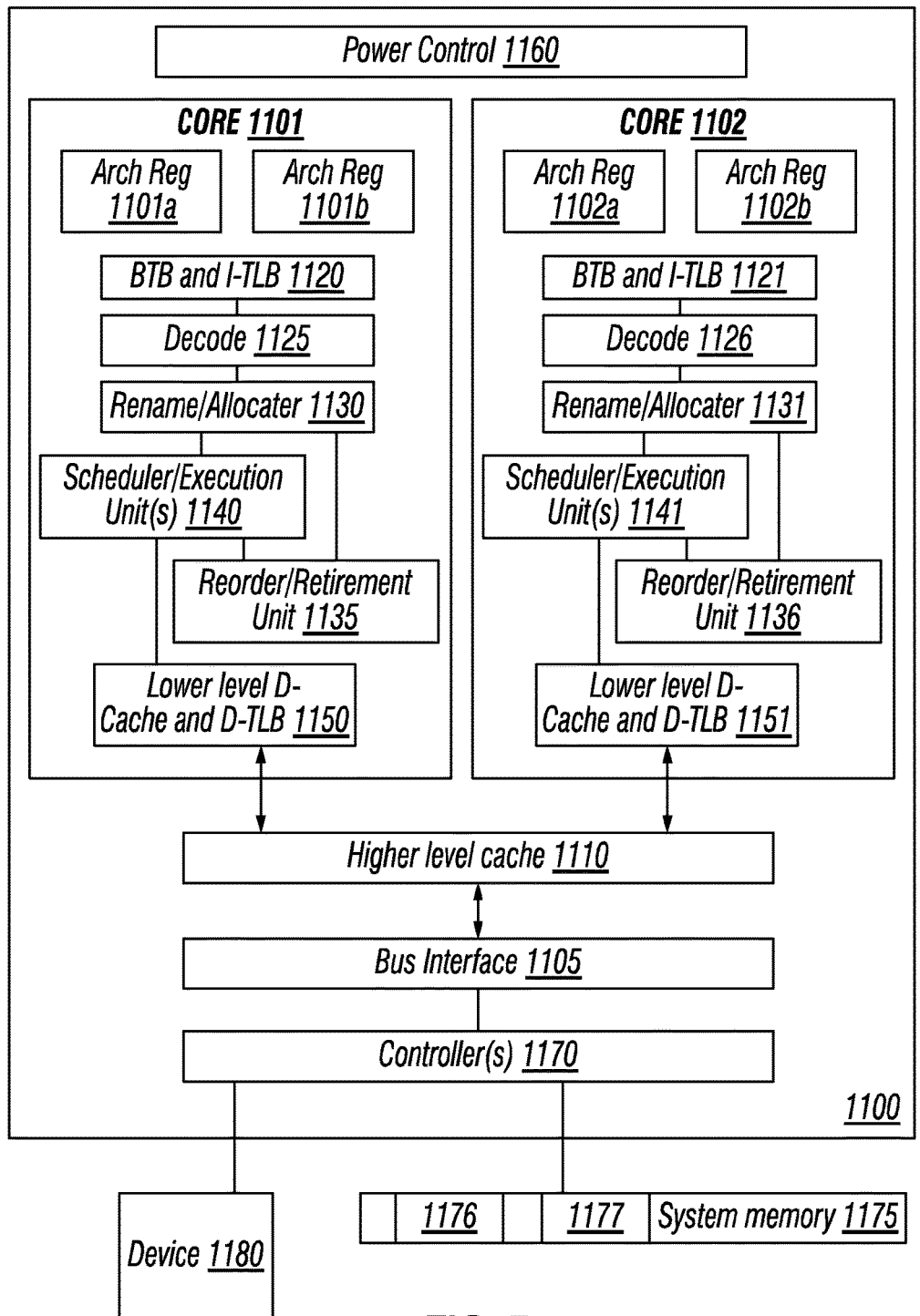
FIG. 7 is a block diagram of a processor including multiple cores in accordance with an embodiment of the present invention.

Referring to FIG. 7, an embodiment of a processor including multiple cores is illustrated. Processor 1100 includes any processor or processing device, such as a microprocessor, an embedded processor, a digital signal processor (DSP), a network processor, a handheld processor, an application processor, a co-processor, a system on a chip (SOC), or other device to execute code. Processor 1100, in one embodiment, includes at least two cores—cores 1101 and 1102, which may include asymmetric cores or symmetric cores (the illustrated embodiment). However, processor 1100 may include any number of processing elements that may be symmetric or asymmetric.

In one embodiment, a processing element refers to hardware or logic to support a software thread. Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor typically refers to an integrated circuit, which potentially includes any number of other processing elements, such as cores or hardware threads.

A core often refers to logic located on an integrated circuit capable of maintaining an independent architectural state, wherein each independently maintained architectural state is associated with at least some dedicated execution resources. In contrast to cores, a hardware thread typically refers to any logic located on an integrated circuit capable of maintaining an independent architectural state, wherein the independently maintained architectural states share access to execution resources. As can be seen, when certain resources are shared and others are dedicated to an architectural state, the line between the nomenclature of a hardware thread and core overlaps. Yet often, a core and a hardware thread are viewed by an operating system as individual logical processors, where the operating system is able to individually schedule operations on each logical processor.

Physical processor 1100, as illustrated in FIG. 7, includes two cores, cores 1101 and 1102. Here, cores 1101 and 1102 are considered symmetric cores, i.e., cores with the same configurations, functional units, and/or logic. In another embodiment, core 1101 includes an out-of-order processor core, while core 1102 includes an in-order processor core. However, cores 1101 and 1102 may be individually selected from any type of core, such as a native core, a software managed core, a core adapted to execute a native instruction set architecture (ISA), a core adapted to execute a translated ISA, a co-designed core, or other known core. Yet to further the discussion, the functional units illustrated in core 1101 are described in further detail below, as the units in core 1102 operate in a similar manner.

As depicted, core 1101 includes two hardware threads 1101a and 1101b, which may also be referred to as hardware thread slots 1101a and 1101b. Therefore, software entities, such as an operating system, in one embodiment potentially view processor 1100 as four separate processors, i.e., four logical processors or processing elements capable of executing four software threads concurrently. As alluded to above, a first thread is associated with architecture state registers 1101a, a second thread is associated with architecture state registers 1101b, a third thread may be associated with architecture state registers 1102a, and a fourth thread may be associated with architecture state registers 1102b. Here, each of the architecture state registers (1101a, 1101b, 1102a, and 1102b) may be referred to as processing elements, thread slots, or thread units, as described above. As illustrated, architecture state registers 1101a are replicated in architecture state registers 1101b, so individual architecture states/contexts are capable of being stored for logical processor 1101a and logical processor 1101b. In core 1101, other smaller resources, such as instruction pointers and renaming logic in allocator and renamer block 1130 may also be replicated for threads 1101a and 1101b. Some resources, such as re-order buffers in reorder/retirement unit 1135, ILTB 1120, load/store buffers, and queues may be shared through partitioning. Other resources, such as general purpose internal registers, page-table base register(s), low-level data-cache and data-TLB 1115, execution unit(s) 1140, and portions of out-of-order unit 1135 are potentially fully shared.

Processor 1100 often includes other resources, which may be fully shared, shared through partitioning, or dedicated by/to processing elements. In FIG. 7, an embodiment of a purely exemplary processor with illustrative logical units/resources of a processor is illustrated. Note that a processor may include, or omit, any of these functional units, as well as include any other known functional units, logic, or firmware not depicted. As illustrated, core 1101 includes a simplified, representative out-of-order (OOO) processor core. But an in-order processor may be utilized in different embodiments. The OOO core includes a branch target buffer 1120 to predict branches to be executed/taken and an instruction-translation buffer (I-TLB) 1120 to store address translation entries for instructions.

Core 1101 further includes decode module 1125 coupled to fetch unit 1120 to decode fetched elements. Fetch logic, in one embodiment, includes individual sequencers associated with thread slots 1101a, 1101b, respectively. Usually core 1101 is associated with a first ISA, which defines/specifies instructions executable on processor 1100. Often machine code instructions that are part of the first ISA include a portion of the instruction (referred to as an opcode), which references/specifies an instruction or operation to be performed. Decode logic 1125 includes circuitry that recognizes these instructions from their opcodes and passes the decoded instructions on in the pipeline for processing as defined by the first ISA. For example, decoders 1125, in one embodiment, include logic designed or adapted to recognize specific instructions, such as transactional instruction. As a result of the recognition by decoders 1125, the architecture or core 1101 takes specific, predefined actions to perform tasks associated with the appropriate instruction. It is important to note that any of the tasks, blocks, operations, and methods described herein may be performed in response to a single or multiple instructions; some of which may be new or old instructions.

In one example, allocator and renamer block 1130 includes an allocator to reserve resources, such as register files to store instruction processing results. However, threads 1101a and 1101b are potentially capable of out-of-order execution, where allocator and renamer block 1130 also reserves other resources, such as reorder buffers to track instruction results. Unit 1130 may also include a register renamer to rename program/instruction reference registers to other registers internal to processor 1100. Reorder/retirement unit 1135 includes components, such as the reorder buffers mentioned above, load buffers, and store buffers, to support out-of-order execution and later in-order retirement of instructions executed out-of-order.

Scheduler and execution unit(s) block 1140, in one embodiment, includes a scheduler unit to schedule instructions/operation on execution units. For example, a floating point instruction is scheduled on a port of an execution unit that has an available floating point execution unit. Register files associated with the execution units are also included to store information instruction processing results. Exemplary execution units include a floating point execution unit, an integer execution unit, a jump execution unit, a load execution unit, a store execution unit, and other known execution units.

Lower level data cache and data translation buffer (D-TLB) 1150 are coupled to execution unit(s) 1140. The data cache is to store recently used/operated on elements, such as data operands, which are potentially held in memory coherency states. The D-TLB is to store recent virtual/linear to physical address translations. As a specific example, a processor may include a page table structure to break physical memory into a plurality of virtual pages.

Here, cores 1101 and 1102 share access to higher-level or further-out cache 1110, which is to cache recently fetched elements. Note that higher-level or further-out refers to cache levels increasing or getting further away from the execution unit(s). In one embodiment, higher-level cache 1110 is a last-level data cache—last cache in the memory hierarchy on processor 1100—such as a second or third level data cache. However, higher level cache 1110 is not so limited, as it may be associated with or includes an instruction cache. A trace cache—a type of instruction cache—instead may be coupled after decoder 1125 to store recently decoded traces.

In the depicted configuration, processor 1100 also includes bus interface module 1105 and a power controller 1160, which may perform power sharing control in accordance with an embodiment of the present invention. Historically, controller 1170 has been included in a computing system external to processor 1100. In this scenario, bus interface 1105 is to communicate with devices external to processor 1100, such as system memory 1175, a chipset (often including a memory controller hub to connect to memory 1175 and an I/O controller hub to connect peripheral devices), a memory controller hub, a North Bridge, or other integrated circuit. And in this scenario, bus 1105 may include any known interconnect, such as multi-drop bus, a point-to-point interconnect, a serial interconnect, a parallel bus, a coherent (e.g. cache coherent) bus, a layered protocol architecture, a differential bus, and a GTL bus.

Memory 1175 may be dedicated to processor 1100 or shared with other devices in a system. Common examples of types of memory 1175 include DRAM, SRAM, non-volatile memory (NV memory), and other known storage devices. Note that device 1180 may include a graphic accelerator, processor or card coupled to a memory controller hub, data storage coupled to an I/O controller hub, a wireless transceiver, a flash device, an audio controller, a network controller, or other known device.

Note however, that in the depicted embodiment, the controller 1170 is illustrated as part of processor 1100. Recently, as more logic and devices are being integrated on a single die, such as SOC, each of these devices may be incorporated on processor 1100. For example, in one embodiment, memory controller hub 1170 is on the same package and/or die with processor 1100. Here, a portion of the core (an on-core portion) includes one or morej controller(s) 1170 for interfacing with other devices such as memory 1175 or a graphics device 1180. The configuration including an interconnect and controllers for interfacing with such devices is often referred to as an on-core (or un-core configuration). As an example, bus interface 1105 includes a ring interconnect with a memory controller for interfacing with memory 1175 and a graphics controller for interfacing with graphics processor 1180. Yet, in the SOC environment, even more devices, such as the network interface, co-processors, memory 1175, graphics processor 1180, and any other known computer devices/interface may be integrated on a single die or integrated circuit to provide small form factor with high functionality and low power consumption.

Figure 8:
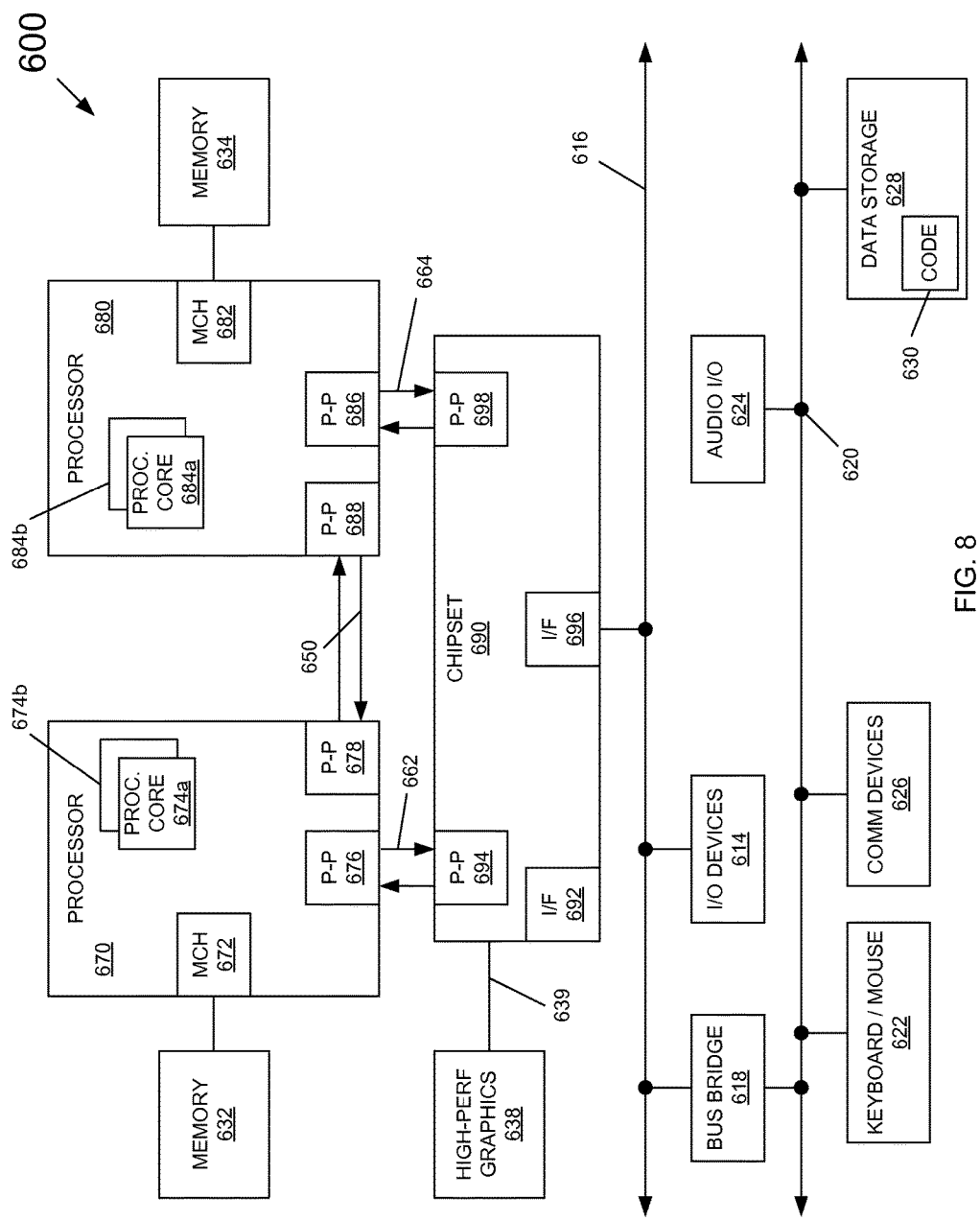
FIG. 8 is a block diagram of a system in accordance with an embodiment of the present invention.

Embodiments may be implemented in many different system types. Referring now to FIG. 8, shown is a block diagram of a system in accordance with an embodiment of the present invention. As shown in FIG. 8, multiprocessor system 600 is a point-to-point interconnect system, and includes a first processor 670 and a second processor 680 coupled via a point-to-point interconnect 650. As shown in FIG. 8, each of processors 670 and 680 may be multicore processors, including first and second processor cores (i.e., processor cores 674a and 674b and processor cores 684a and 684b), although potentially many more cores may be present in the processors. Each of the processors can include a PCU and other logic to dynamically determine both a computed dynamic capacitance and a maximum dynamic capacitance value, and to schedule and/or reschedule code execution based at least in part on such information, as described herein.

Still referring to FIG. 8, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 8, MCH's 672 and 682 couple the processors to respective memories, namely a memory 632 and a memory 634, which may be portions of system memory (e.g., DRAM) locally attached to the respective processors. First processor 670 and second processor 680 may be coupled to a chipset 690 via P-P interconnects 662 and 664, respectively. As shown in FIG. 8, chipset 690 includes P-P interfaces 694 and 698.

Furthermore, chipset 690 includes an interface 692 to couple chipset 690 with a high performance graphics engine 638, by a P-P interconnect 639. In turn, chipset 690 may be coupled to a first bus 616 via an interface 696. As shown in FIG. 8, various input/output (I/O) devices 614 may be coupled to first bus 616, along with a bus bridge 618 which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio I/O 624 may be coupled to second bus 620. Embodiments can be incorporated into other types of systems including mobile devices such as a smart cellular telephone, tablet computer, netbook, Ultrabook™, or so forth.

Figure 9:
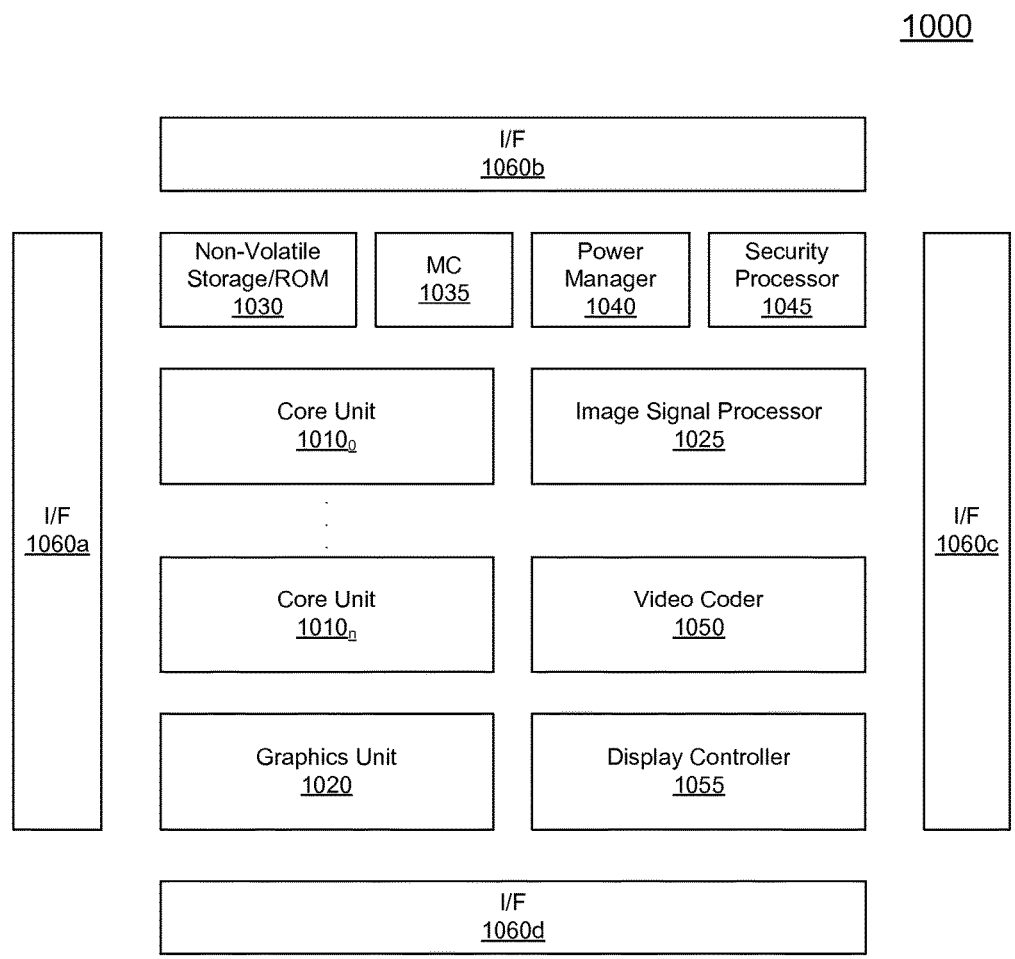
FIG. 9 is a block diagram of a processor in accordance with another embodiment of the present invention.

Referring now to FIG. 9, shown is a block diagram of a processor in accordance with another embodiment of the present invention. In the embodiment of FIG. 9, processor 1000 may be a system on a chip (SoC) including multiple domains, each of which may be controlled to operate at an independent operating voltage and operating frequency. As a specific illustrative example, processor 1000 may be an Intel® Architecture Core™-based processor such as an i3, i5, i7 or another such processor available from Intel Corporation, Santa Clara, Calif. However, other low power processors such as available from Advanced Micro Devices, Inc. (AMD) of Sunnyvale, Calif., an ARM-based design from ARM Holdings, Ltd. or customer thereof or a MIPS-based design from MIPS Technologies, Inc. of Sunnyvale, Calif., or their licensees or adopters may instead be present in other embodiments such as an Apple A5 processor, a Qualcomm Snapdragon processor, or Texas Instruments OMAP processor. Such SoC may be used in a low power system such as a smartphone, tablet computer, Ultrabook™ computer or other portable computing device.

In the high level view shown in FIG. 9, processor 1000 includes a plurality of core units $1010_0$-$1010_n$. Each core unit may include one or more processor cores, one or more cache memories and other circuitry. Each core unit 1010 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.) or other instruction set or combinations thereof. Note that some of the core units may be heterogeneous resources (e.g., of a different design). In addition, each such core may be coupled to a cache memory which in an embodiment may be a shared level (L2) cache memory. A non-volatile storage 1030 may be used to store various program and other data. For example, this storage may be used to store at least portions of microcode, boot information such as a BIOS, other system software or so forth.

Each core unit 1010 may also include an interface such as a bus interface unit to enable interconnection to additional circuitry of the processor. In an embodiment, each core unit 1010 couples to a coherent fabric that may act as a primary cache coherent on-die interconnect that in turn couples to a memory controller 1035. In turn, memory controller 1035 controls communications with a memory such as a dynamic random access memory (DRAM) (not shown for ease of illustration in FIG. 9).

In addition to core units, additional processing engines are present within the processor, including at least one graphics unit 1020 which may include one or more graphics processing units (GPUs) to perform graphics processing as well as to possibly execute general purpose operations on the graphics processor (so-called GPGPU operation). In addition, at least one image signal processor 1025 may be present. Signal processor 1025 may be configured to process incoming image data received from one or more capture devices, either internal to the SoC or off-chip. Other accelerators also may be present. In the illustration of FIG. 9, a video coder 1050 may perform coding operations including encoding and decoding for video information, e.g., providing hardware acceleration support for high definition video content. A display controller 1055 further may be provided to accelerate display operations including providing support for internal and external displays of a system. In addition, a security processor 1045 may be present to perform security operations such as secure boot operations, various cryptography operations and so forth.

Each of the units may have its power consumption controlled via a power manager 1040. Power manager 1040 includes control logic to perform a dynamic capacitance analysis as described herein.

In some embodiments, SoC 1000 may further include a non-coherent fabric coupled to the coherent fabric to which various peripheral devices may couple. One or more interfaces 1060a-1060d enable communication with one or more off-chip devices. Such communications may be according to a variety of communication protocols such as PCIe™, GPIO, USB, I2C, UART, MIPI, SDIO, DDR, SPI, HDMI, among other types of communication protocols. Although shown at this high level in the embodiment of FIG. 9, understand the scope of the present invention is not limited in this regard.

Figure 10:
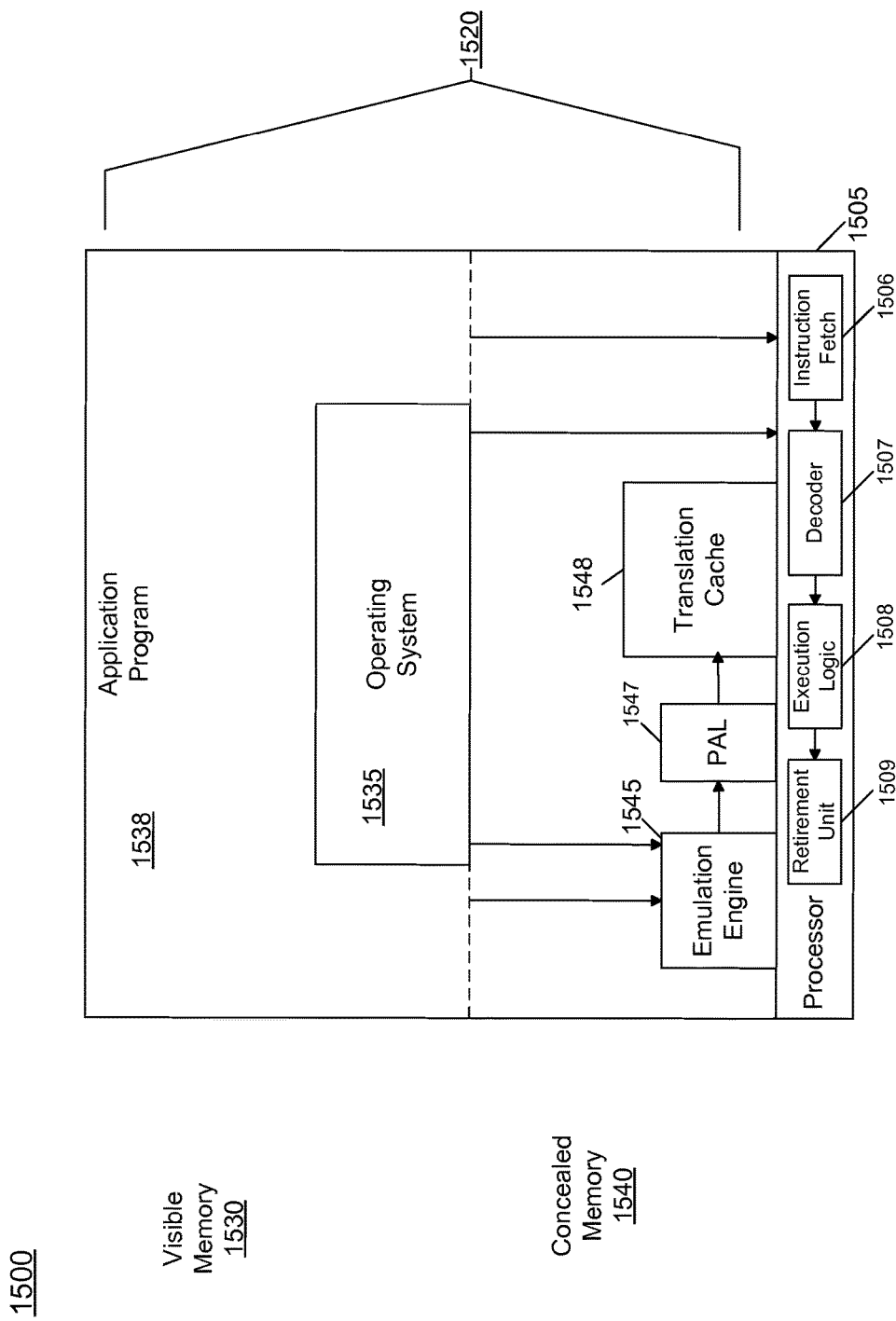
FIG. 10 is a co-design environment including a processor and a memory in accordance with an embodiment.

Referring now to FIG. 10, a co-design environment 1500 includes a processor 1505 and a memory 1520 which in one embodiment may be a system memory such as a dynamic random access memory (DRAM). As seen, processor 1505 may have a given micro-architecture and may be coupled to memory 1520 by way of, e.g., a point-to-point interconnect, bus or other such manner. As seen, processor 1505 which may be a co-design processor, includes front end units such as an instruction fetcher 1506 that can receive instructions directly from the OS or application programs. These instructions, which may be macro-instructions, e.g., corresponding to user-level instructions of an application program can be decoded using a decoder 1507, which may operate to decode the instructions and access corresponding micro-operations (uops), e.g., present in a microcode storage of processor 1505. In turn, decoder 1507 may provide the uops to one or more execution units 508, which may include various arithmetic logic units (ALUs), specialized hardware and other types of computation units. Results from these instructions may be provided to a retirement unit 1509, which operates to retire the instructions to thus store the results to an architectural state of the processor in program order, if no fault or exceptions occurred. While described as an in-order machine, embodiments can equally be implemented using an out-of-order machine.

In a visible portion of memory 1520, namely a first portion 1530, one or more operating systems 1535 and application programs 1538 may be stored. This portion is termed "visible" as it can be visible to user-level code (i.e., the application program 1538) and visible to the OS (both OS 1535 and program 1538). Depending on the type of instructions to be executed in these programs, communication may be directly with processor 1505, e.g., by way of using instruction decoders present in the processor to handle such instructions.

Alternately, for various code sequences that can be optimized using translated code or for such sequences in which micro-architecture support is not provided, embodiments may use a concealed portion of the memory, namely a second portion 1540, in order to provide translated code to processor 1505. Specifically, as seen, both OS 1535 and application program 1538 may communicate with an emulation engine 1545, which may include a runtime execution unit including interpretation, translation and optimization mechanisms. Note that concealed memory 1540 is not visible or accessible to the OS or application programs. Emulation engine 1545 may thus provide code and address information to a translation cache 1548, which may include translated code that can be provided to processor 1505 for execution. In one embodiment, code stored in translation cache 1548 may be encrypted. This translated code may be written and optimized for the underlying micro-architecture of the processor, e.g., target ISA code.

As further shown in FIG. 10, a power analysis logic 1547 may couple between emulation engine 1545 and translation cache 1548. In an embodiment, power analysis logic 1547 may receive incoming scheduled instructions (which have been translated to translate code of the underlying hardware). Logic 1547 may determine a dynamic capacitance value for this translated code and compare it to a maximum dynamic capacitance value to determine whether the code may execute within the given power envelope of the processor. If so, the code is provided to translation cache 1548, as described above. Otherwise, a feedback signal is sent back to emulation engine 1545, which may cause the code to be rescheduled in a more power aware manner such that when the rescheduled code is provided to power analysis logic 1547, the computed dynamic capacitance value may be below the maximum dynamic capacitance value.

By performing dynamic code scheduling/rescheduling as described herein, a processor may execute a power intensive application or other program without power excursions, while maintaining a given operating frequency and voltage. That is, embodiments may enable power aware operation while maintaining a substantially constant operating frequency and voltage. Also by using an embodiment, processors may operate with lower guardbands (e.g., with regard to maximum voltage, frequency, current or so forth), realizing higher yield or better performance at a certain power budget, or lower power at a given performance target. Furthermore, a processor in accordance with an embodiment may be implemented into a system with less robust power delivery capabilities, cheaper packaging, and/or cooling solutions.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

The following examples pertain to further embodiments.

In one example, a processor comprises: a schedule logic to schedule a set of instructions for execution in an execution logic of the processor; and a power analysis logic including a first calculation logic to calculate a maximum dynamic capacitance for at least a portion of the processor and a second calculation logic to calculate a dynamic capacitance estimate for execution of the set of instructions. In an example, the power analysis logic is to enable the set of instructions to be provided to the execution logic if the dynamic capacitance estimate is less than the maximum dynamic capacitance, and otherwise to cause the schedule logic to reschedule the set of instructions.

In an example, the processor further includes a translation logic to translate a first group of instructions of a first instruction set architecture into the set of instructions, where the set of instructions are of a second instruction architecture.

In an example, the execution logic is to execute the first set of instructions. The first calculation logic may calculate the maximum dynamic capacitance based at least in part on a current voltage, frequency, and temperature of the processor. The first calculation logic may update the maximum dynamic capacitance when at least one of the current voltage, frequency, and temperature changes by a threshold amount.

In an example, the second calculation logic may calculate the dynamic capacitance estimate based on capacitance information stored in a lookup table. The lookup table may include a plurality of entries each associating a dynamic active capacitance value with one or more instructions. The second calculation logic may access the lookup table to determine an active capacitance value for each of the set of instructions and to calculate the dynamic capacitance estimate based at least in part on the active capacitance value for each of the set of instructions.

In an example, the second calculation logic may filter a calculated dynamic active capacitance value for the first set of instructions and to generate the dynamic capacitance estimate based at least in part on the filtered calculated dynamic active capacitance value. The second calculation logic may further generate the dynamic capacitance estimate based on a dynamic idle capacitance value.

Note that the above processor can be implemented using various means.

In an example, the processor comprises a system on a chip (SoC) incorporated in a user equipment touch-enabled device.

In another example, a system comprises a display and a memory, and includes the processor of one or more of the above examples.

In another example, a method comprises: scheduling a first set of instructions to execute on a processor; calculating a dynamic active capacitance for the first set of instructions; determining a dynamic capacitance estimate based on the calculated dynamic active capacitance and a dynamic idle capacitance; and executing the first set of instructions if the dynamic capacitance estimate is less than a threshold dynamic capacitance, and otherwise re-scheduling the first set of instructions.

In an example, the method further comprises determining the threshold dynamic capacitance based at least in part on a current voltage, frequency, and temperature of the processor. The method may further comprise updating the threshold dynamic capacitance when at least one of the current voltage, frequency, and temperature changes by a threshold amount.

In an example, the method further comprises scheduling the first set of instructions via a binary translator of the processor that receives a group of instructions of a first instruction set architecture and translates the group of instructions into the first set of instructions of a second instruction set architecture of the processor.

In an example, calculating the dynamic active capacitance comprises accessing a lookup table to determine a dynamic active capacitance value for each of the first set of instructions, calculating a dynamic active capacitance estimate based at least in part on the dynamic active capacitance value for each of the first set of instructions, and combining the dynamic active capacitance estimate with a dynamic idle capacitance value to obtain the dynamic active capacitance.

In an example, calculating the dynamic active capacitance includes, for each of a plurality of cycles within the first set of instructions: mapping each instruction of a cycle to the dynamic active capacitance value; and summing the dynamic active capacitance value of concurrent instructions of the cycle to obtain a dynamic active capacitance sum.

In an example, calculating the dynamic active capacitance further includes, for each of the plurality of cycles within the first set of instructions: averaging the dynamic active capacitance sum from a subset of the plurality of cycles, to obtain an average dynamic active capacitance sum for each of the plurality of cycles within the first set of instructions; and selecting the maximum average dynamic active capacitance sum. Calculating the dynamic capacitance for the first set of instructions further includes adding an idle dynamic capacitance value to the maximum average active capacitance sum, in an example.

In another example, a communication device is arranged to perform the method of any of the above examples.

In another example, at least one machine readable medium comprises a plurality of instructions that in response to being executed on a computing device, cause the computing device to carry out a method according to any of the above examples.

In a still further example, a system comprises: a processor including: a translation logic to receive a first portion of an application and to translate the first portion into a code block; a scheduling logic to schedule the translated code block to an instruction window; a power analysis logic to determine whether a dynamic capacitance of the code block exceeds a threshold dynamic capacitance and if so, to cause the scheduling logic to reschedule the code block, and otherwise to enable the code block to be communicated to an execution logic; and the execution logic to execute the code block. The system may further include a dynamic random access memory (DRAM) coupled to the processor.

In an example, the power analysis logic includes a first logic to calculate the dynamic capacitance based at least in part on a dynamic capacitance value associated with each instruction to be executed in the code block.

In an example, the power analysis logic includes a second logic to determine the threshold dynamic capacitance based at least in part on a voltage, a frequency, a temperature, and a power allocation of the processor.

In an example, the scheduling logic is to reschedule the code block into a rescheduled code block including one or more additional instructions than present in the code block.

In an example, the scheduling logic is to reschedule the code block to include one or more instructions of a second vector width in place of one or more instructions of a first vector width present in the code block, the first vector width greater than the second vector width.

Understand that various combinations of the above examples are possible.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A processor comprising:
a schedule logic to schedule a set of instructions for execution in an execution logic of the processor; and
a power analysis logic including:
a first calculation logic to receive the set of instructions, dynamically calculate a maximum allowed dynamic capacitance for at least a portion of the processor based at least in part on a maximum power limit for the processor, a leakage current and a current voltage, frequency, and temperature of the processor; and
a second calculation logic to calculate a dynamic capacitance estimate for execution of the set of instructions;
wherein the power analysis logic is to enable the set of instructions to be provided to the execution logic for the execution logic to execute if the dynamic capacitance estimate is less than the maximum allowed dynamic capacitance, and if the dynamic capacitance estimate exceeds the maximum allowed dynamic capacitance to send a feedback signal to the schedule logic to cause the schedule logic to reschedule the set of instructions scheduled by the schedule logic, including to replace at least one first instruction of the set of instructions to accomplish an operation with at least one second instruction to accomplish the operation.

2. The processor of claim 1, wherein the processor further comprises a translation logic to translate a first group of instructions of a first instruction set architecture into the set of instructions, wherein the set of instructions are of a second instruction set architecture.

3. The processor of claim 2, wherein the execution logic is to execute the set of instructions.

4. The processor of claim 1, wherein the first calculation logic is to update the maximum allowed dynamic capacitance when at least one of the current voltage, frequency, and temperature changes by a threshold amount.

5. The processor of claim 1, wherein the second calculation logic is to calculate the dynamic capacitance estimate based on capacitance information stored in a lookup table.

6. The processor of claim 5, wherein the lookup table comprises a plurality of entries each associating a dynamic active capacitance value with one or more instructions.

7. The processor of claim 6, wherein the second calculation logic is to access the lookup table to determine an active capacitance value for each of the set of instructions and to calculate the dynamic capacitance estimate based at least in part on the active capacitance value for each of the set of instructions.

8. The processor of claim 1, wherein the second calculation logic is to filter a calculated dynamic active capacitance value for the set of instructions and to generate the dynamic capacitance estimate based at least in part on the filtered calculated dynamic active capacitance value.

9. The processor of claim 8, wherein the second calculation logic is to further generate the dynamic capacitance estimate based on a dynamic idle capacitance value.

10. A non-transitory machine-readable medium having stored thereon instructions, which if performed by a machine cause the machine to perform a method comprising:
scheduling, in a schedule logic of a processor, a first set of instructions to execute on the processor according to a first schedule;

calculating a dynamic active capacitance for the first set of instructions;

determining a dynamic capacitance estimate based on the calculated dynamic active capacitance and a dynamic idle capacitance;

determining a threshold dynamic capacitance based at least in part on a maximum power limit, a leakage current, and a current voltage, frequency, and temperature of the processor; and providing the first set of instructions to an execution logic of the processor for executing the first set of instructions if the dynamic capacitance estimate is less than the threshold dynamic capacitance, and if the dynamic capacitance estimate exceeds the threshold dynamic capacitance providing a feedback signal to the schedule logic to enable the schedule logic for re-scheduling the first set of instructions, the re-scheduling including inserting at least one instruction not present in the first schedule to replace at least one original instruction present in the first schedule.

11. The non-transitory machine-readable medium of claim 10 wherein the method further comprises updating the threshold dynamic capacitance when at least one of the current voltage, frequency, and temperature changes by a threshold amount.

12. The non-transitory machine-readable medium of claim 10, wherein the method further comprises scheduling the first set of instructions via a binary translator of the processor that receives a group of instructions of a first instruction set architecture and translates the group of instructions into the first set of instructions of a second instruction set architecture of the processor.

13. The non-transitory machine-readable medium of claim 10, wherein calculating the dynamic active capacitance comprises accessing a lookup table to determine a dynamic active capacitance value for each of the first set of instructions, calculating a dynamic active capacitance estimate based at least in part on the dynamic active capacitance value for each of the first set of instructions, and combining the dynamic active capacitance estimate with a dynamic idle capacitance value to obtain the dynamic active capacitance.

14. The non-transitory machine-readable medium of claim 13, wherein calculating the dynamic active capacitance includes, for each of a plurality of cycles within the first set of instructions:

mapping each instruction of a cycle to the dynamic active capacitance value; and summing the dynamic active capacitance value of concurrent instructions of the cycle to obtain a dynamic active capacitance sum.

15. The non-transitory machine-readable medium of claim 14, wherein calculating the dynamic active capacitance further includes, for each of the plurality of cycles within the first set of instructions:

averaging the dynamic active capacitance sum from a subset of the plurality of cycles, to obtain an average dynamic active capacitance sum for each of the plurality of cycles within the first set of instructions; and selecting the maximum average dynamic active capacitance sum of the plurality of cycles.

16. The non-transitory machine-readable medium of claim 15, wherein calculating the dynamic active capacitance for the first set of instructions further includes adding an idle dynamic capacitance value to the maximum average active capacitance sum.

17. A system comprising:

a processor including:

a translation logic to receive a first portion of an application and to translate the first portion into a code block;

a scheduling logic to schedule the code block to an instruction window;

a power analysis logic to determine whether a dynamic capacitance of the code block exceeds a threshold dynamic capacitance and if so, send a feedback signal to the scheduling logic to cause the scheduling logic to reschedule the code block, and if the dynamic capacitance of the code block does not exceed the threshold dynamic capacitance to enable the code block to be communicated to an execution logic to enable the execution logic to execute the code block, the power analysis logic to dynamically determine the threshold dynamic capacitance based at least in part on a maximum power limit, a leakage current, a voltage, a frequency, a temperature, and a power allocation of the processor, wherein the scheduling logic is to reschedule the code block to include at least one instruction of a second vector width in place of at least one instruction of a first vector width present in the code block, the first vector width greater than the second vector width; and the execution logic to execute the code block; and a dynamic random access memory (DRAM) coupled to the processor.

18. The system of claim 17, wherein the power analysis logic includes a first logic to calculate the dynamic capacitance based at least in part on a dynamic capacitance value associated with each instruction to be executed in the code block.

19. The system of claim 17, wherein the scheduling logic is to reschedule the code block into a rescheduled code block including one or more additional instructions than present in the code block.

* * * * *